(No Model.)
R. N. PRATT.
COCK.
No. 552,199.  Patented Dec. 31, 1895.
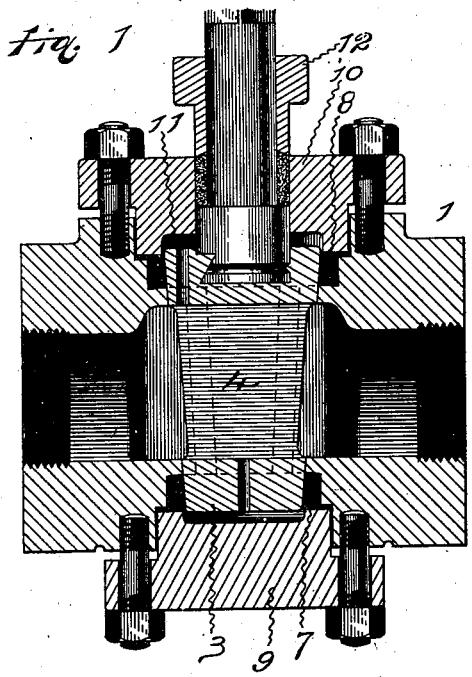
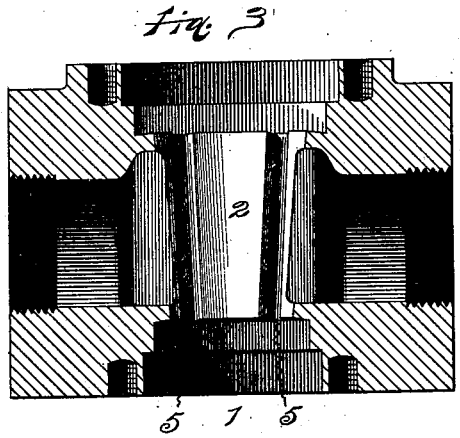
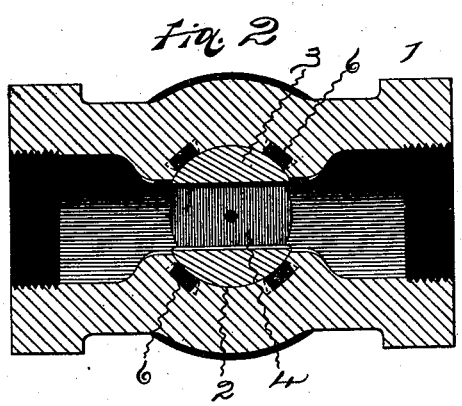
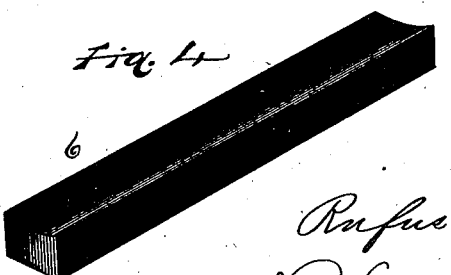
Witnesses:
C. E. Buckland.
E. J. Hyde.
Inventor:
Rufus N. Pratt
Harry P. Williams
atty.

UNITED STATES PATENT OFFICE.

RUFUS N. PRATT, OF HARTFORD, CONNECTICUT, ASSIGNOR TO THE PRATT & CADY COMPANY, OF SAME PLACE.

COCK.

SPECIFICATION forming part of Letters Patent No. 552,199, dated December 31, 1895.

Application filed December 5, 1893. Serial No. 492,854. (No model.)

*To all whom it may concern:*

Be it known that I, RUFUS N. PRATT, a citizen of the United States, residing at Hartford, in the county of Hartford and State of Connecticut, have invented certain new and useful Improvements in Cocks, of which the following is a specification.

The invention relates to the class of rotary plug-cocks that are made tight by packings inserted into grooves formed in the body of the cock about the plug, and the object is to provide a cock for use in steam or other high-pressure systems, also in systems in which there flows fluid containing destructive gases, acids or alkalies, that may at any time when the old packing becomes damaged or worn be renewed and made tight for high pressures by a packing that, while cheap, is durable, occupies but little space and can be readily placed in position by any one without removing the cock from its connections.

Referring to the accompanying drawings, in which the invention is illustrated, Figure 1 is a central vertical section of one of the cocks. Fig. 2 is a horizontal section of the same. Fig. 3 is a vertical section of the body only, and Fig. 4 is an enlarged perspective view of one of the packing-sticks.

In the views, 1 indicates the body of the cock, which is cast to shape of iron or any other suitable metal, with any ordinary means for attaching it to the pipe ends of the system in which it is to be placed. This body has the usual fluid-way with a circular plug-chamber 2 at the middle, in which is located the rotary plug 3, having the port 4, that is made of iron or any other suitable material to fit the walls of the plug-chamber.

In the adaptation of the invention shown in the drawings the body of the cock is formed with an opening through the walls at both the top and bottom ends of the plug-chamber, which openings are usually circular and somewhat larger in diameter than the diameter of the plug-chamber. In the walls of the plug-chamber, usually extending from one opening to the other, are made two or more grooves 5, that may be either rectangular or dovetailed in cross-section, as indicated in Fig. 2, and in these grooves are inserted the packings 6. These packings are independent perfectly-formed sticks or pieces usually having more elasticity than the metal of the cock-body, made to fit the grooves into which they are to be inserted with a little projecting beyond the surfaces of the walls of the chamber to properly pack the joint, and they are preferably molded to shape of a fibrous material, as asbestos, which insures considerable tensile strength and wearing resistance as well as elasticity to the packing, which fibrous material may be bound together by rubber or other gum provided with a hardening agent and made into a very dense and hard mass of the required size to fit the grooves by heat and pressure or vulcanization. Sticks made and pressure or vulcanization. Sticks made in this manner when inserted in the grooves are very strong and durable. They make a tight joint and are not readily attacked by disintegrating substances in the fluids passing through the cocks; but, of course, they may be made of other materials and by any one readily slipped into place when the grooves are clear to accomplish the desired result.

In the form of cock shown, after the packing-sticks have been placed in position, rings 7 and 8, preferably of the same or a similar material as the sticks, are placed in the upper and lower openings at the ends of the packing-sticks about the ends of the plug, and then glands or bonnets 9 and 10 are placed in the openings outside the packing-rings. When a balanced plug is used, similar to that shown in the drawings, to prevent the escape of fluid from the chamber 11 above the larger end of the plug, a packing-gland 12 is placed around the spindle where it passes through the bonnet. Of course, when the bottom of the cock-body is not cut away or opened there will be no necessity for the bottom gland 9; but it is desirable to have the plug-chamber open through both the top and bottom walls of the body, in order that the worn sticks may be readily driven out, so that new ones may be substituted. These independent sticks, formed to the final shape, easily slip into the grooves, so as to fit and pack tightly against the plug, and they are held in place by the packing-rings at the ends under the pressure of the bolts or fastenings of the glands when screwed up, so that the plug can easily be forced farther into the tapering chamber in order to take up the ordinary wear without slipping the packing-sticks out of position.

A cock made as above described can be readily and quickly renewed by any one when the packings become worn without removing the cock from its connections or even letting down the pressure of the fluid in the system, for without removing the plug, when the glands are taken off, by means of a hammer and nail or other similar means the worn packing-sticks can be driven out and new ones at once substituted. In fact, the old ones can be pushed out by the new ones that are being driven in. These cocks are simple and can be provided with very durable packing-sticks that have great tensile strength and resistance to frictional wear, which sticks can also be made self-lubricating by incorporating into the mixture, when they are being formed into shape, some natural mineral lubricant, as plumbago. These packings, while very efficient, are cheap, and being small and regularly shaped occupy but little space, so that a large number can be kept on hand and immediately used should a leak occur, without removing the cock from its connections or even reducing the fluid-pressure, which feature is very valuable for steamship service, where it is often desirable to repack a cock without disturbing the system or causing delay. Cocks made in this manner and provided with these independent, removable, homogeneous sticks are also particularly valuable for use in chemical plants, as they permit the ready insertion of packings which are most suitable for the specific purpose to which the cock is applied, or to resist the special fluid that is to flow through the system in which the cock is located, as sticks of various materials formed so as to resist different attacking substances, either gases, acids or alkalies, can be kept on hand and readily changed, as desired, without removing the cock. The sticks, which are much protected in the grooves and by the end packing-rings, may be made in a very durable manner, of the most suitable materials for the purpose to which the cock is to be used, and they are interchangeable, so that a large stock of cocks may be kept on hand and some made applicable to one use and some to another by a simple substitution of a different packing; but the chief advantage of this improved cock resides in the renewability of the packings when they become worn.

I claim as my invention—

A plug cock, consisting of a body having a fluid way and a plug chamber opening through the walls of the body, with longitudinal grooves in the walls of the plug chamber opening at both ends of the plug-chamber, independent stiff and homogeneous packing sticks formed to final shape and loosely placed in said grooves so they may be removed when desired, and removable packing rings located at each end of the grooves, whereby, when the packing rings are removed, the sticks are accessible at each end, substantially as specified.

RUFUS N. PRATT.

Witnesses:
HARRY R. WILLIAMS,
C. E. BUCKLAND.